UNITED STATES PATENT OFFICE 1,927,928

SEPARATION OF VAT DYESTUFF ISOMERS OF THE NAPHTHOYLENE DIARYLIMIDAZOLE SERIES AND THE PRODUCT OBTAINABLE THEREBY

Wilhelm Eckert and Heinrich Sieber, Frankfort-on-the-Main-Hochst, Germany, assignors to General Aniline Works, Inc., New York, N. Y., a corporation of Delaware No Drawing. Application October 5, 1931, Serial No. 567,128, and in Germany October 13, 1930

8 Claims. (Cl. 260—44)

The present invention relates to the separation of vat dyestuff isomers and to new products obtainable thereby.

In the U. S. Patent No. 1,588,451 there is described a process which comprises condensing a 1.4.5.8-naphthalene-tetra-carboxylic acid compound with an ortho-diamine compound. The products thus obtainable are valuable dyestuffs, although they are not of uniform constitution, but rather represent mixtures of isomeric dyestuffs. When condensing, for instance, 1.4.5.8.-naphthalene-tetra carboxylic acid with ortho-phenylenediamine a mixture of the two isomeric dyestuffs of the following formulae:

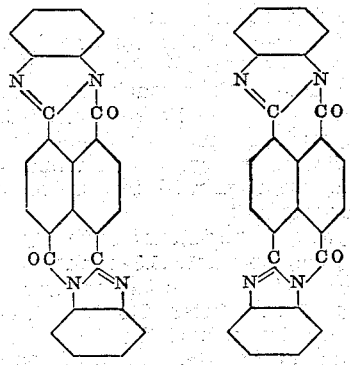

is obtained. When condensing a substituted ortho-phenylenediamine compound with 1.4.5.8-naphthalene-tetra-carboxylic acid in many cases the same holds true, i. e. there is likewise obtained a mixture of the isomers.

The present invention relates to a process of separating the dyestuff mixtures obtainable according to U. S. Patent No. 1,588,451 into their components. Another object of our invention are new products obtainable according to our new process.

We have found that the dyestuff mixtures obtainable according to U. S. Patent No. 1,588,451 can be separated into their components by a suitable treatment with an alkali metal hydroxide. The nature of our new process has not been definitely cleared up. Most probably by the aforementioned treatment with an alkali metal hydroxide the dyestuff isomers which probably possess the following configuration:

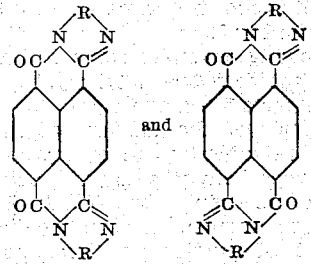

wherein R represents an aromatic hydrocarbon radical which may contain substituents are converted into new alkali metal addition compounds of the dyestuff isomers proper. We assume that these new compounds possess the following configuration:

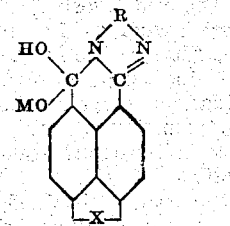

wherein X represents the following bivalent radical:

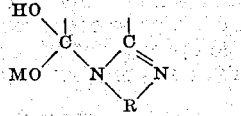

R represents an aromatic hydrocarbon radical, especially a phenylene or a polynuclear hydrocarbon radical, which may contain substituents, and M stands for an alkali metal.

The new compounds represent always colorless products, whereas the dyestuff isomers are intensely colored products. The new products are soluble in water of a definite alkalinity. The clear solutions slowly undergo a hydrolyzation process. The hydrolyzation is accelerated by diluting or acidifying the before-mentioned solutions. The new compounds may be used for dyeing purposes as well as for cloth printing. The alkali metal addition products of the dyestuff isomers differ substantially as to their corresponding solubility; the difference in every instance, as far as it is known to us, being so pronounced that this property of the new products can be utilized for separating in a very simple way the mixture of the dyestuff isomers into their components. As mentioned before, the mixture of the dyestuffs is treated with an alkali metal hydroxide so as to form the alkali metal addition products which are separated into the components by means of their different solubility whereafter the alkali metal addition products are converted into the dyestuffs proper by a suitable hydrolyzation process.

In the process of preparing the new alkali metal addition products one may work at room temperature as well as at elevated temperature. In general, the formation of the addition products is accelerated by the use of an elevated temperature such as, for instance, 60° C. to 70° C. or the boiling temperature of alcohol. In the process of preparing the new addition products it may be of advantage to use either water as the diluent, as hereinafter shown in Example 4, or to use a solvent which is mixable with water such as ethyl alcohol as it is shown, for instance, in the following Examples 1 to 3.

The following examples serve to illustrate the invention, but they are not intended to limit it thereto the parts being by weight:

(1) 10 parts of the mixture of the isomeric dyestuffs obtainable by condensing 1.4.5.8-naphthalene-tetracarboxylic acid with ortho-phenylenediamine according to U. S. Patent No. 1,588,451, are warmed in a finely divided form with 20 parts of caustic potash and about 50 parts of ethyl alcohol until the red color of the solution has disappeared. Thereupon, about 90 parts of ethyl alcohol are added and the whole is heated for ½ hour to 70° C.–80° C. After cooling, the solution is filtered with suction and the remaining solid matter is washed with a small quantity of ethyl alcohol containing caustic potash. From the filtrate the red dyestuff is precipitated by means of water, whereas the orange dyestuff remains on the filter in the form of its KOH compound. It is likewise hydrolyzed by means of water. Instead of ethyl alcohol other alcohols may be used, for instance, methyl alcohol; instead of caustic potash there may be used other alkalies, such as caustic soda.

The dyestuffs thus obtained have the same properties as those obtained according to U. S. Patent No. application Serial No. 441,712 filed on April 4, 1930, in the name of Wilhelm Eckert, Heinrich Greune and Willy Eicholz for "New vat dyestuffs and a process of preparing them".

The addition product of the orange part of the dyestuff mixture probably has the following formula:

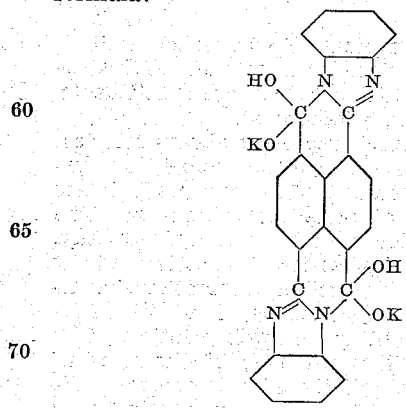

forming colorless, quadratic tablets which do not melt even at 350° C. The product may be used for dyeing purposes as well as for cloth printing.

By introducing it into water, it hydrolyzes quickly with conversion into the orange dyestuff proper.

The addition product of the red part of the dyestuff mixture posseses probably the following constitution:

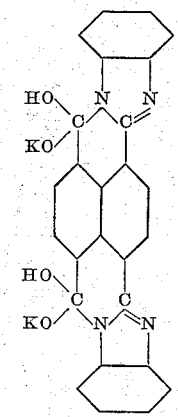

forming feeble yellow prisms which, when introduced into water, remain dissolved for a prolonged time and afterwards hydrolyze gradually to the Bordeaux-red dyestuff proper.

(2) 25 parts of the mixture of isomeric dyestuffs obtainable by condensing 1.4.5.8-naphthalene-tetracarboxylic acid with 1.2-dichloro-4.5-diaminobenzene according to U. S. Patent No. 1,588,451, are warmed with 50 parts of caustic soda and, about 310 parts of ethyl alcohol until the formation of the colorless addition compound is terminated. It is filtered with suction and the remaining solid matter is decomposed by means of water into an orange colored dyestuff. From the filtrate there is precipitated on addition of water, the dark red isomeride.

(3) The mixture of the isomeric dyestuffs obtainable by condensing 1.4.5.8-naphthalene-tetracarboxylic acid with 4-ethoxy-1.2-diaminobenzene according to U. S. Patent No. 1,588,451 may be decomposed in a manner similar to that described in Example 1, by way of an alkali-addition compound, into a yellowish brown dyestuff and a bluish brown dyestuff.

(4) 50 parts of the mixture of the dyestuffs obtainable by condensing 1.4.5.8-naphthalene-tetracarboxylic acid with ortho-phenylenediamine (according to U. S. Patent No. 1,588,451) are introduced in a finely divided state into a solution of 200 parts of caustic potash in 200 parts of water. The addition of about 20 parts of ethyl alcohol promotes the wetting of the dyestuff particles and, consequently, accelerates the reaction with the alkali. The whole is heated for 2 to 3 hours at 120° C; thereupon, 140 parts of water are added and the whole is cooled to 20° C. After standing for a prolonged time, the KOH compound of the one of the isomers crystallizes and separates. It is filtered by suction, washed with alcohol containing alkali and worked up as described in Example 1.

In the same or a very similar manner the following dyestuffs may be separated into their isomers:

1.4.5.8 - naphthoylene - dimethyl - dibenzimidazole.

1.4.5.8 - naphthoylene - tetramethyl - dibenzimidazole.

1.4.5.8-naphthoylene-dichloro-dibenzimidazole.

1.4.5.8-naphthoylene-dibromo-dibenzimidazole.

1.4.5.8-naphthoylene-dinitro-dibenzimidazole.

1.4.5.8-naphthoylene-dimethoxy-dibenzimidazole.

1.4.5.8 - napthoylene-dibromo-dichloro-dibenzimidazole.

1.4.5.8-naphthoylene-dinaphthimidazole.

We claim:

1. As new products, the compounds of the following probable formula:

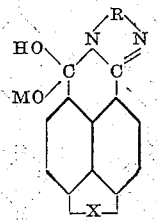

wherein X represents the following bivalent radical

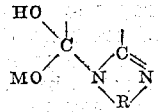

R represents a bivalent radical of the benzene and naphthalene series, bound in ortho-positions to the nitrogen atoms of the molecule, and M stands for an alkali metal, being nearly colorless products dissolving in water of a definite alkalinity to clear solutions which slowly undergo a hydrolyzation process which process is accelerated by diluting or acidifying these solutions, said products being capable of being used for dyeing purposes as well as for cloth printing.

2. As a new product, the compound of the following probable formula:

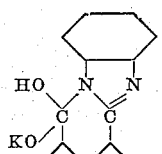

said product being capable of being used for dyeing purposes as well as for cloth printing, forming colorless, quadratic tablets which do not melt even at 350° C. and, on introduction into water, hydrolyzing quickly with conversion into the orange dyestuff proper.

3. As a new product, the compound of the following probable formula:

said product being capable of being used for dyeing purposes as well as for cloth printing, forming feebly yellow prisms which, when introduced into water, remain dissolved for a prolonged time and afterwards hydrolyze gradually to the Bordeaux-red dyestuff proper.

4. The process which comprises causing an alkali metal hydroxide to react with a mixture of isomeric dyestuffs of the following general formulæ:

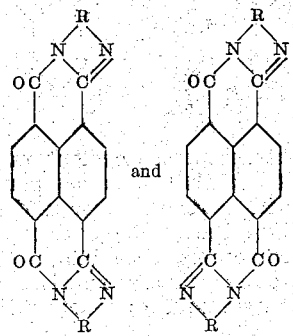

wherein R represents a bivalent radical of the benzene and naphthalene series, bound in ortho positions to the nitrogen atoms of the molecules.

5. The process which comprises causing caustic potash to react with a mixture of isomeric dyestuffs of the following general formulæ:

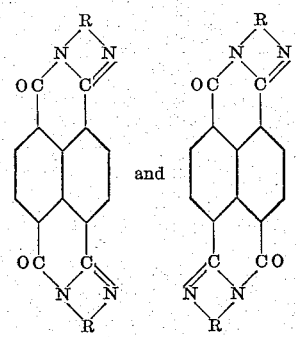

wherein R represents a bivalent radical of the benzene and naphthalene series, bound in ortho positions to the nitrogen atoms of the molecules.

6. The process which comprises causing caustic potash to react with a mixture of isomeric dyestuffs of the following general formulæ:

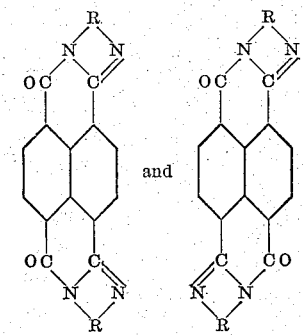

wherein R represents a bivalent radical of the benzene and naphthalene series, bound in ortho positions to the nitrogen atoms of the molecules, in the presence of a diluent of the group consisting of water and organic solvents miscible with water.

7. The process which comprises causing an alkali metal hydroxide to react with a mixture of isomeric dyestuffs of the following general formulæ:

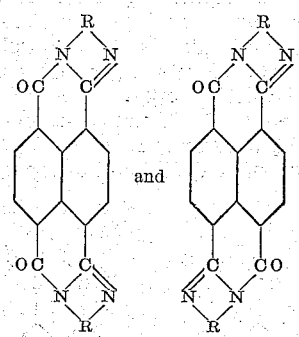

wherein R represents a bivalent radical of the benzene and naphthalene series, bound in ortho positions to the nitrogen atoms of the molecules, and separating the products thus obtained by means of their different solubility.

8. The process which comprises causing an alkali metal hydroxide to react with a mixture of isomeric dyestuffs of the following general formulæ:

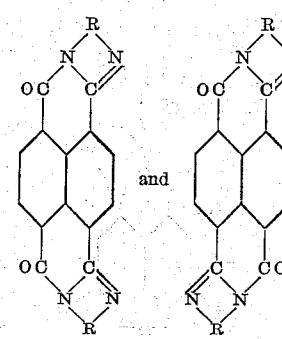

wherein R represents a bivalent radical of the benzene and naphthalene series, bound in ortho position to the nitrogen atoms of the molecules, and separating the products thus obtained by means of their different solubility and subjecting the separated products to a hydrolyzation process.

WILHELM ECKERT.
HEINRICH SIEBER.